United States Patent
Frodigh et al.

[11] Patent Number: 6,104,933
[45] Date of Patent: Aug. 15, 2000

[54] METHOD AND APPARATUS FOR CONTROL OF BASE STATIONS IN MACRO DIVERSITY RADIO SYSTEMS

[75] Inventors: Magnus Frodigh, Kista; Fredric Kronestad, Stockholm; Mikael Gudmunson; Magnus Almgren, both of Kista, all of Sweden

[73] Assignee: Telefonaktiebolaget LM Ericsson, Stockholm, Sweden

[21] Appl. No.: 08/880,746

[22] Filed: Jun. 23, 1997

[51] Int. Cl.[7] ......................................................... H04B 7/00
[52] U.S. Cl. ........................ 455/522; 455/226.3; 455/67.3
[58] Field of Search .................................. 455/67.3, 67.7, 455/69, 226.2, 226.3, 522, 524, 525, 560, 561

[56] References Cited

U.S. PATENT DOCUMENTS

| | | | |
|---|---|---|---|
| 5,175,867 | 12/1992 | Wejke et al. | 455/439 |
| 5,507,035 | 4/1996 | Bantz et al. | 455/133 |
| 5,539,728 | 7/1996 | Gaiani et al. | 370/342 |
| 5,542,111 | 7/1996 | Ivanov et al. | 455/522 |
| 5,574,466 | 11/1996 | Reed et al. | 342/359 |
| 5,584,049 | 12/1996 | Weaver, Jr. et al. | 455/67.1 |
| 5,586,170 | 12/1996 | Lea | 379/60 |
| 5,590,409 | 12/1996 | Sawahashi et al. | 455/69 |
| 5,839,056 | 11/1998 | Hakkinen | 455/69 |
| 5,864,760 | 1/1999 | Gilhousen et al. | 455/442 |
| 5,926,747 | 7/1999 | Komara et al. | 455/69 |

FOREIGN PATENT DOCUMENTS

| | | | |
|---|---|---|---|
| WO91/07037 | 5/1991 | WIPO | H04L 27/30 |
| WO93/21700 | 10/1993 | WIPO | H04B 17/00 |

*Primary Examiner*—William G. Trost
*Assistant Examiner*—Sonny Trinh
*Attorney, Agent, or Firm*—Burns, Doane, Swecker & Mathis, L.L.P.

[57] ABSTRACT

A method and apparatus for controlling an amount of downlink power to be applied in each downlink transmission in a macro diversity radio system. Downlink power level is controlled in response to a quality measurement of a corresponding uplink. In accordance with exemplary embodiments, a path gain or a carrier-to-interference ratio of an uplink is measured at a base station in an active set, and subsequently used to proportionally govern a downlink transmission power level for a corresponding downlink. In such a fashion, each downlink handling a mobile station maintains a desired level of robustness, while avoiding introduction of unnecessary system interference.

39 Claims, 8 Drawing Sheets

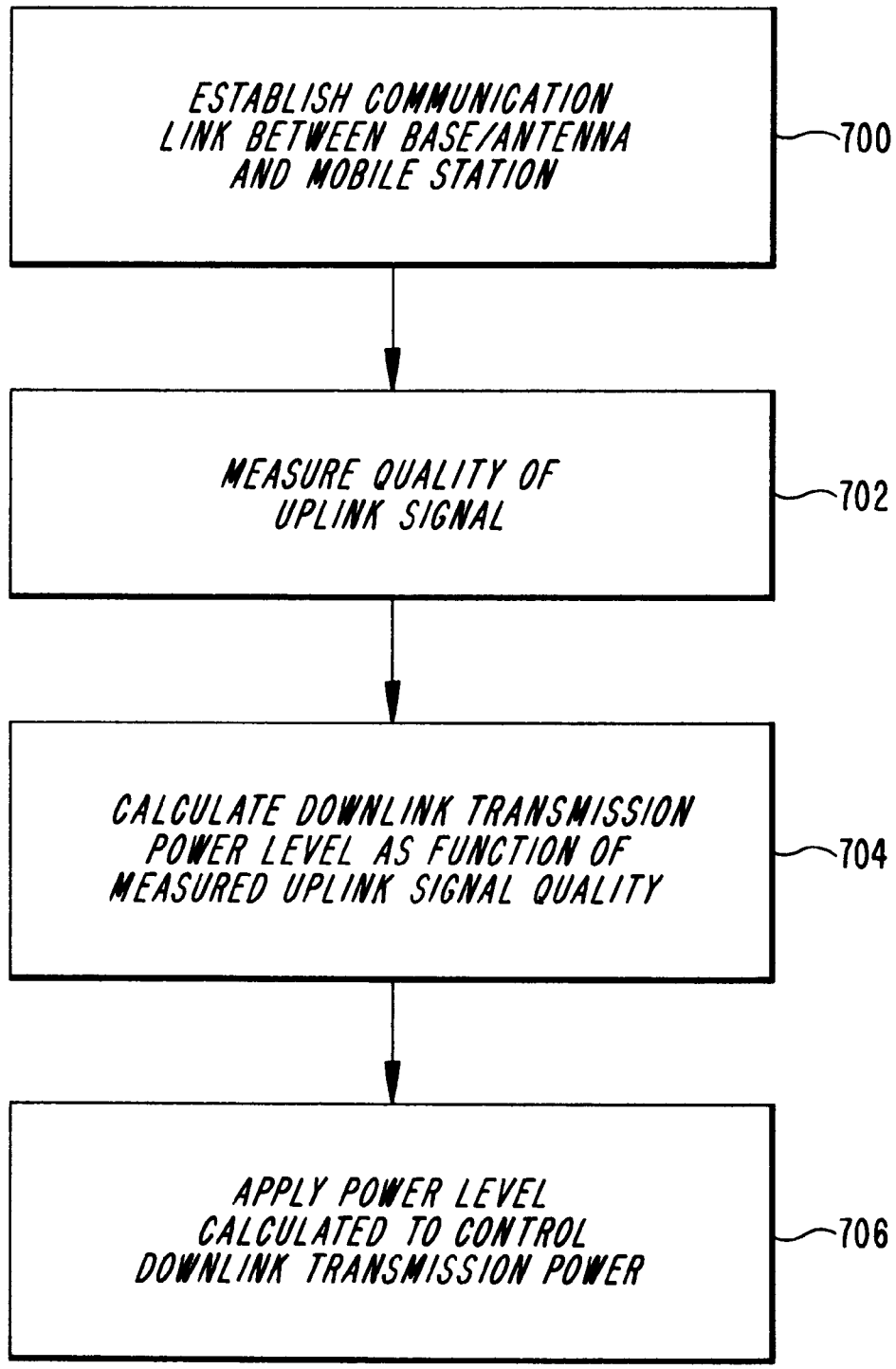

METHOD AND APPARATUS FOR CONTROL OF BASE STATIONS IN MACRO DIVERSITY RADIO SYSTEMS

FIELD OF THE INVENTION

This invention generally relates to the field of communication systems having a macro diversity capability and, more particularly, to controlling the transmission power of one or more transmitters used to send information to a mobile station.

BACKGROUND OF THE INVENTION

A simplified layout of a cellular communications system is depicted in FIG. 1. Mobile stations M1–M10 communicate with the fixed part of a public switched telephone network (PSTN) by transmitting radio signals to, and receiving radio signals from, cellular base stations B1–B10. The cellular base stations B1–10 are, in turn, connected to the PSTN via a Mobile Switching Center (MSC). Each base station B1–B10 transmits signals within a corresponding area, or "cell" C1–C10. Within each cell, a base station transmits to the mobile units over downlink RF channels, while the mobile units transmit information to the base station over uplink RF channels. As depicted in FIG. 1, an idealized arrangement of base stations can be organized so that the cells substantially cover an area in which mobile telephone communication ordinarily occurs (e.g., a metropolitan area), with a minimum amount of overlap.

While cellular systems were originally designed to operate with a one-to-one correspondence between a mobile station and an associated base station covering a geographic cell, it has been determined that the effects of shadowing and fading can be reduced by communicating the same signal to a mobile station over more than one link. For instance, two different base stations can communicate the same information to a mobile station over two different spatially offset links. The mobile station processes the signals from the two links by combining them in some way, e.g., maximal ratio combining. This technique is known as diversity. Conventional spatial diversity techniques employ two or more separated antennas in a single base station, or two or more base stations, to communicate with a mobile station. However, diversity is not limited to spatially offsetting base stations or antennas (i.e., multiple transmission paths). Diversity transmission can be generated using one or more of an offset in time, polarization, or frequency. An example of time diversity is interleaving, which is used in the IS-54B EIA/TIA standard for North American digital cellular systems. Frequency diversity is implemented by transmitting the same information on two different frequencies, however, such a scheme fails to make efficient use of the frequency spectrum. As described briefly above, the concept of space diversity involves the receipt of signals over multiple signal paths.

Because spacial diversity can involve using two entirely different base stations to communicate with a mobile station, the technique has also been called macro diversity. However, as used herein, the term macro diversity can also involve an arrangement wherein antennas used for the diversity transmissions are located close to one another, or even co-located in a same base station. FIGS. 2–5 depict several exemplary macro diversity arrangements.

FIG. 2 illustrates a macro diversity arrangement wherein a first base station 202 and a second base station 204 each transmit a same message 206 to a mobile station 208. The message 206 is transmitted to the mobile station 208 over different signal paths in the forms of a first downlink 210 and a second downlink 212. The first and second downlink signals 210 and 212 are recombined in the mobile station 208 to extract the message 206. The mobile station 208 transmits to the base stations 202 and 204 over first and second uplink paths 214 and 216, respectively.

FIG. 3 illustrates a macro diversity arrangement wherein the same message 306 is broadcast from a first antenna 304 and a second antenna 305. The antennas 304 and 305 have different polarization characteristics, e.g., horizontal and vertical polarization, but are located in the same base station 302. First and second downlinks 310 and 312 communicate the message 306 from the base station 302 to the mobile station 308, while first and second corresponding uplinks 314 and 316 communicate from the mobile station 308 to the base station 302.

FIG. 4 depicts a macro diversity arrangement for an indoor RF communication system in which one or more of first, second and third antennas 402, 404 and 410 transmit a signal containing the same message 406 to a mobile unit 408. As depicted, first and second downlinks 410 and 412 communicate the message 406 from antennas 404 and 410, respectively, to the mobile station 408. First and second uplinks 414 and 416 communicate from the mobile station 408 to the antennas 404 and 410, respectively.

FIG. 5 depicts a single base station macro diversity arrangement wherein first and second directional lobes 518 and 520, generated by an antenna array 504, each cover a separate coverage area. The first directional lobe 518 maintains a first macro diversity link including a first downlink 510 which carries a message 506. The second directional lobe 520 maintains a second macro diversity link including a second downlink 512 which also carries the message 506. First and second uplinks 514 and 516 communicate from the mobile station 508 to the antenna array 504 within each lobe 518 and 520, respectively.

In a macro diversity arrangement, the base stations and/or antennas communicating with a particular mobile station are known as "active set" members. For example, referring back to FIG. 4, antennas 404 and 410 would be considered members of the active set. Members of an active set can change as the mobile station passes into and out of coverage areas handled by base stations and/or antennas in the system. As known to those skilled in the art, the addition and deletion of base stations and/or antennas to and from an active set can be used to achieve handoff.

Macro diversity increases robustness, achieves improved downlink quality, and combats fading. However, the additional active transmitting elements in a macro diversity scheme increases interference (i.e., the C/I ratio) for surrounding mobile and/or base stations operating in the vicinity. Conventional macro diversity systems ordinarily utilize the same amount of downlink transmit power for each antenna in the active set. For instance, in IS-95 systems, the same transmit power level is used for all downlinks in the active set. Because of the undesirable interference to other users, careful consideration is required in adding and deleting members from the active set so that the interference in unrelated links is minimized. Accordingly, one method for controlling interference is to limit the number of base stations and/or antennas in an active set.

Another method used in conventional systems to reduce the effects of unnecessary interference from macro diversity operation is power split control. In power split control, the downlink transmit power may be equally split between each active base station and/or antenna in an active set. That is, in the case where there are three downlinks, and a total transmission power of P is available, each of the downlinks has a transmission power level of P/3. However, even with such an allocation, there may be an unnecessary amount of interference introduced when the "weakest" downlink in the active set is operated at a P/3 power level. More specifically, the link may, in effect provide a small improvement in communications robustness, but introduce, on balance, a greater amount of disruption to surrounding communications by unduly introducing interference. Consequently, the C/I ratio for adjacent cells can be negatively impacted with only a minimal gain in communications efficiency.

In DS-CDMA systems, a proportional downlink transmission power control method is used that allots downlink transmit power in accordance with the characteristics of the downlink signal received by mobile stations. More specifically, an amount of transmit power used for a downlink is defined based on pilot channel signal strength and interference values of downlink signals as measured at the mobile station. The measurement information is then reported to the system by the mobile station. Such a system is desirable because it permits only a minimum amount of power to be used to maintain a desirable level of communication efficiency, while at the same time introducing a minimal amount of interference to adjacent, unrelated, links. However, the DS-CDMA system has many shortcomings.

For example, DS-CDMA systems require significant information overhead and consume important resources to carry out downlink power control. The DS-CDMA downlink power control system uses mobile stations to periodically measure path gain characteristics for cells adjacent to the mobile station. Measurement reports are regularly transmitted reported back on associated uplinks. Because so-called "fast" power control is frequently used in DS-CDMA systems, the measure and transfer of information can require that approximately 10% of uplink frame capacity be dedicated to downlink measurement information and reports. Consequently, there is less frame capacity for other information. The mobile station must also perform additional processing to measure, format and transmit the measurement information. This has the effect of consuming processing resources, elevating design complexity and increasing handset power consumption.

What is needed is a system of downlink transmit power control for each antenna and/or base station downlink which does not diminish the information capacity of frames transmitted by a mobile station. It would be further desirable to provide a downlink power control system that does not burden the mobile station with additional tasks such as measuring the quality of a downlink, and processing and transmitting the measurement data.

SUMMARY OF THE INVENTION

The present invention solves the forgoing problems by providing a power control system for controlling downlink power in a macro diversity system by measuring the quality of an uplink signal at a base station. The present invention relieves the mobile station from having to perform extra processing or sacrificing uplink frame capacity for measurement information. As a result, production costs, design complexity and power consumption related to the mobile station are reduced while still providing downlink power control. In accordance with exemplary embodiments of the invention, uplink quality can be gauged either by taking measurements of the uplink, or using uplink quality factors that are already available in accordance with system standards (e.g., GSM or D-AMPS). The uplink quality information is used by control means within one or more base stations, or node connected thereto, associated with the active set to control downlink transmission power levels. By controlling downlink transmission power in this fashion, those members of the active set most likely to achieve the best downlink quality are controlled to transmit at an appropriate power level. Remaining downlinks typically are controlled to transmit at a lower power level. In this way, downlinks in the active set transmit at a level to minimize an amount of interference while still maintaining robust communication through macro diversity communication.

More specifically, systems in accordance with exemplary embodiments of the present invention provide a method for controlling transmission power used in a downlink signal from a base station to a mobile station in a macro diversity radio system. An exemplary method includes measuring a quality of an uplink signal received in the base station and then controlling a downlink transmission power level in response to the measure of quality of the uplink signal.

Exemplary embodiments may involve an apparatus for controlling transmission power in a downlink between a base station and a mobile station in a macro diversity radio system. The apparatus typically includes a means for measuring a quality of an uplink signal received in the base station from the mobile station. A means for controlling the amount of transmission power level used for the downlink signal operates based on the quality of the uplink signal measured by the measurement means.

In accordance with exemplary embodiments, downlink transmission power control is rendered in accordance with the path gain of a corresponding uplink, and/or the carrier-to-interference ratio of a corresponding uplink.

BRIEF DESCRIPTION OF THE DRAWINGS

The objects and advantages of the invention will be understood by reading the following detailed description in conjunction with the drawings in which:

FIG. 7 is a flow diagram illustrating a process in accordance with exemplary embodiments of the invention;

DETAILED DESCRIPTION OF THE PREFERRED EMBODIMENTS

Figure 3:
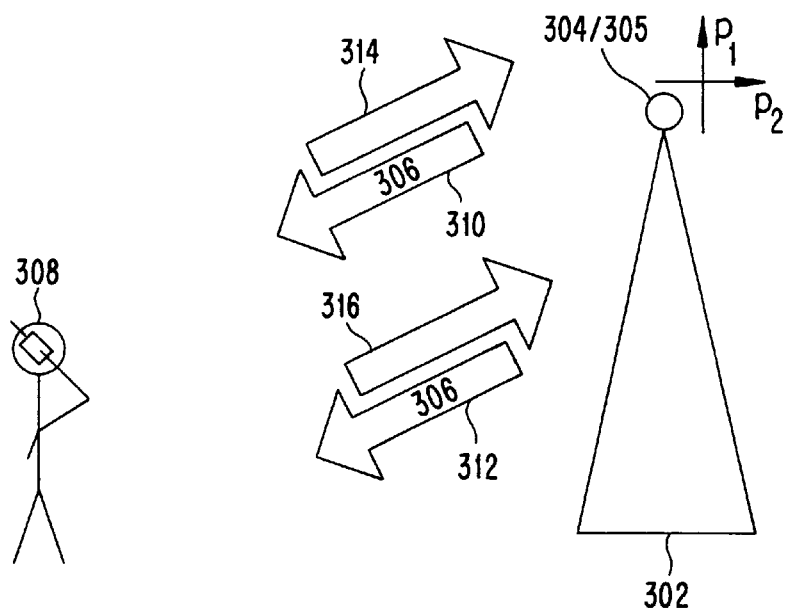
FIG. 3 depicts a macro diversity scenario wherein an individual base station communicates with a mobile station using two downlink antennas which have polarities offset from one another.
Figure 5:
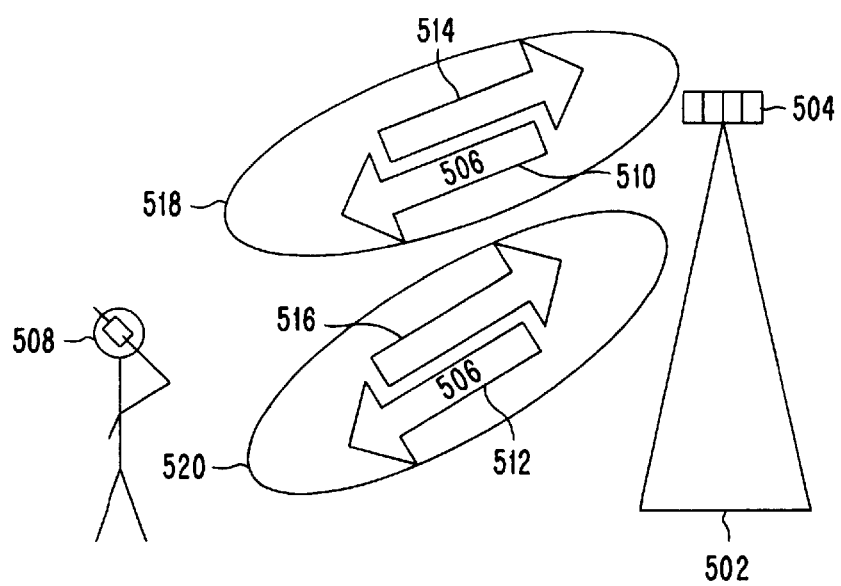
FIG. 5 depicts a macro diversity scenario wherein an individual base station communicates with a mobile station using an array antenna which propagates separate lobes each of which handles a different coverage area.
Figure 6A:
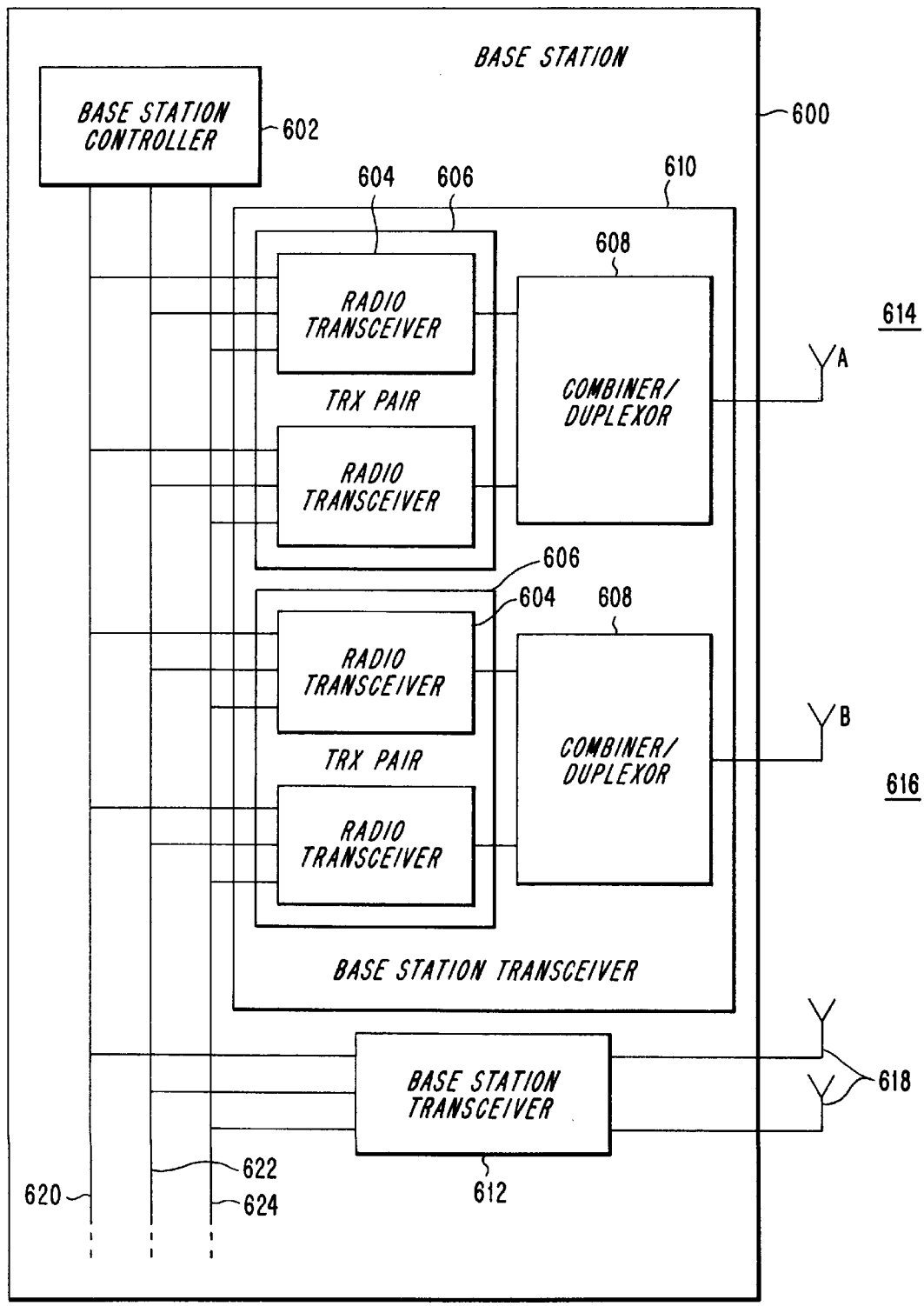
FIGS. 6A and 6B are circuit diagrams of conventional mobile and base station elements.

FIG. 6A is a block diagram depicting the elements of an exemplary base station 600 that has a macro diversity capability and thus can be operated in accordance with the present invention. The base station 600 includes a base station control unit 602 which controls radio transceivers 606. Signals communicated to and from the radio transceivers 606 are combined and duplexed, respectively, by one or more combiners 608. The combiners 608 may each be connected to an antennas array or to respective vertical and horizontal polarized antennas. The antenna array may have beam lobes 614 and 616 which cover separate geographic areas (see e.g., FIG. 5). The latter antenna arrangement is analogous to the one illustrated in FIG. 3. The base station control unit 602 communicates with elements of the base station transceivers 606 over a traffic bus 620, a timing bus 622 and a baseband bus 624. As will be appreciated by those skilled in the art and discussed briefly in the Background section above, an alternative arrangement involving one or more base stations, each having singular antennas, can be used to facilitate macro diversity communications in accordance with the present invention.

Figure 6B:
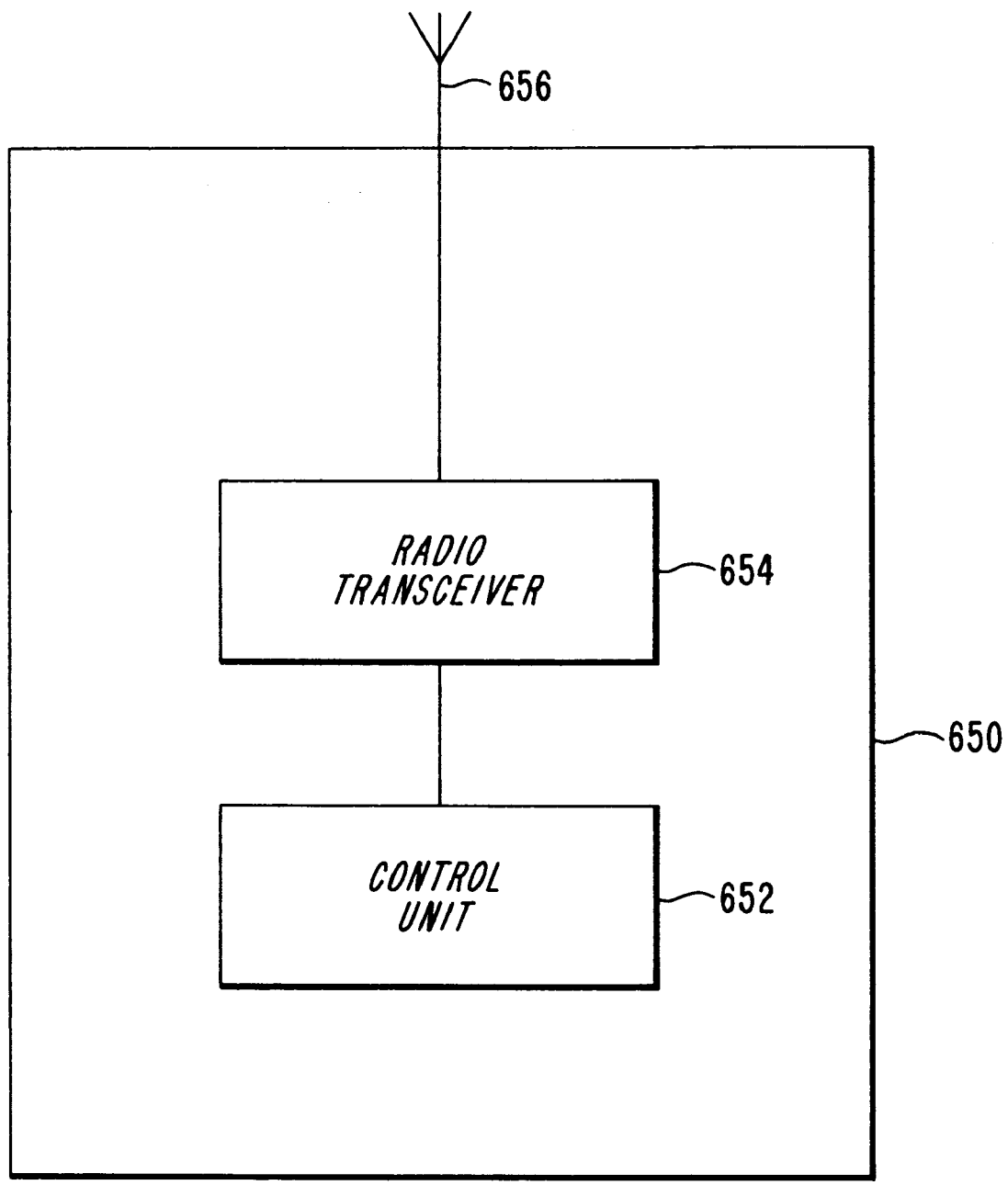

As depicted in FIG. 6B, an exemplary mobile station 650 includes a controller 652 which is coupled to a radio transceiver 654, which, in turn, is connected to an antenna 656. In accordance with macro diversity operations, one skilled in the art will appreciate that the mobile station 650 has the capability to recombine downlink diversity signals received from one or more base stations and/or antennas.

Figure 1:
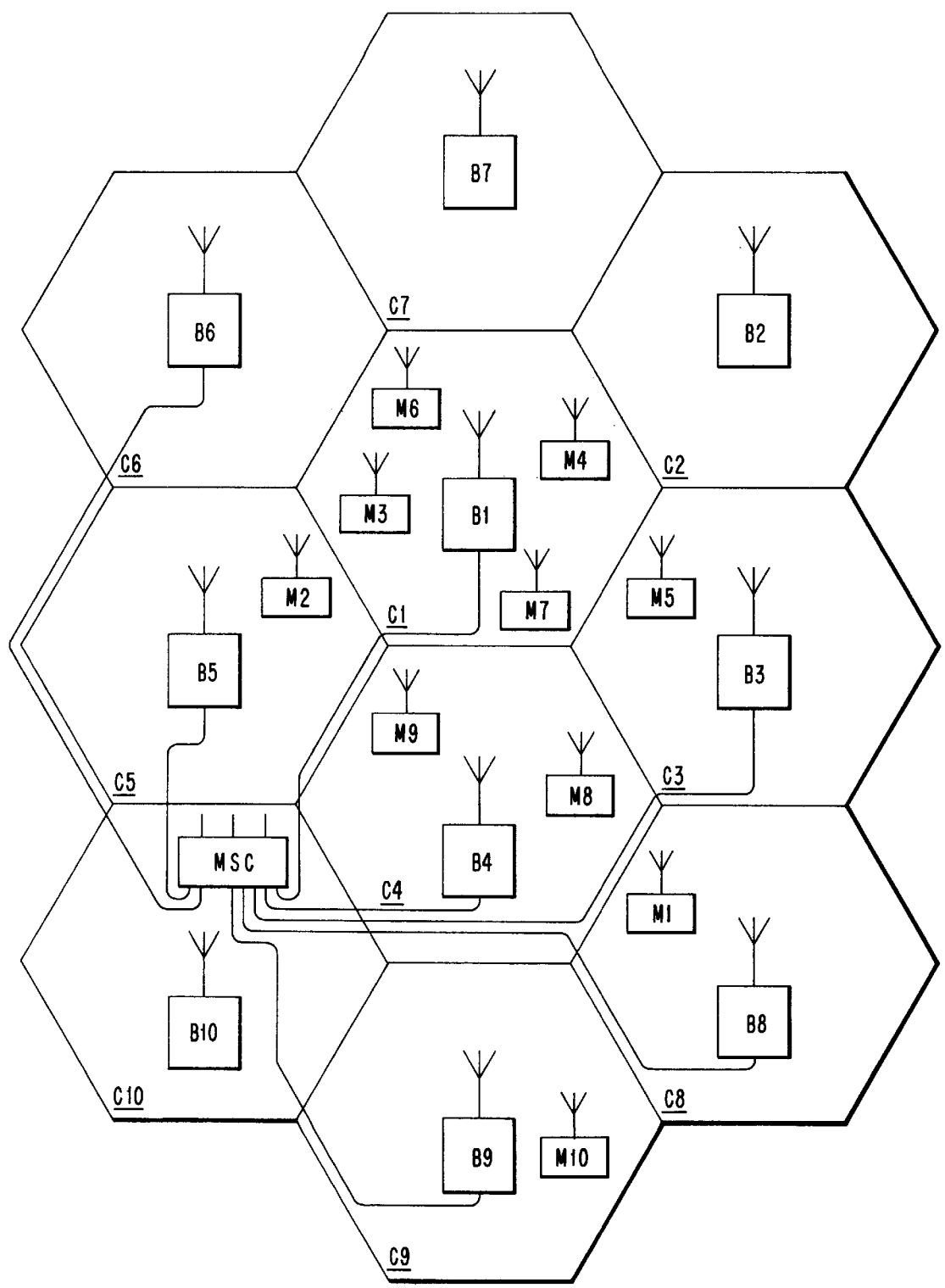
FIG. 1 depicts a conventional cellular communication system in which the present invention can be utilized.
Figure 2:
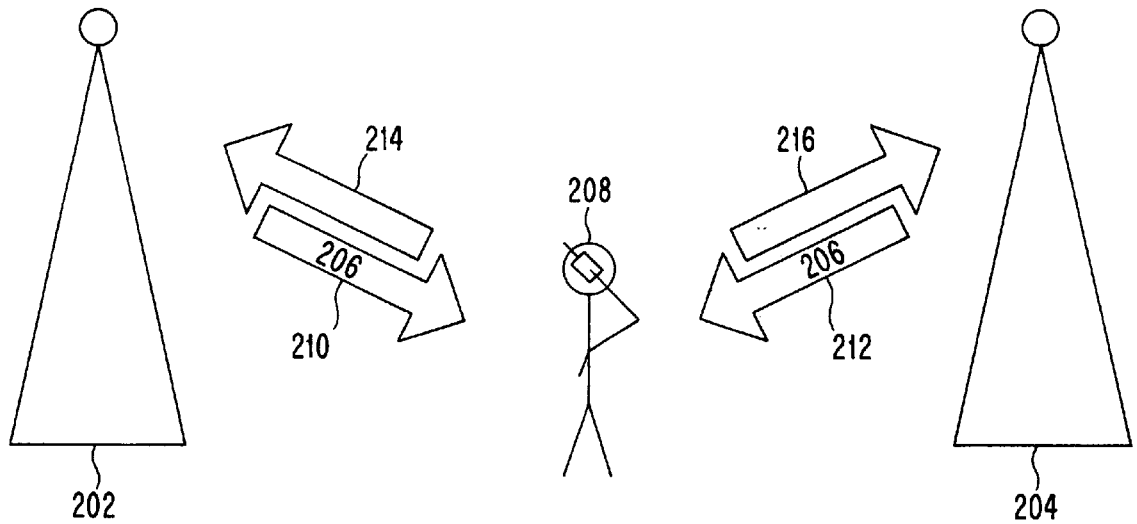
FIG. 2 depicts a macro diversity scenario wherein two individual base stations communicate with a mobile station.

Base station operation in accordance with exemplary embodiments of the invention will now be described with respect to FIG. 2 wherein two separate base stations 202 and 204 are used to communicate diversity signals to a mobile station 208. However, as will be appreciated by those skilled in the art, the diversity signals discussed can originate from two or more antennas on a same base station. Referring now to FIG. 2, an exemplary embodiment of the present invention can involve a first base station 202 and a second base station 204, both of which communicate common information 206 using separate downlink paths 210 and 212, respectively, to a mobile station 208. Communication from the mobile station 208 to the base stations 202 and 204 involves a first uplink 214 to the first base station 202, and a second uplink 216 to the second base station 204. In accordance with an exemplary aspect of the invention, the level of transmission power used for each of the first and second downlinks 210 and 212, depends upon a quality measurement taken for the corresponding uplinks 214 and 216, respectively, at the base stations 202 and 204.

An exemplary process in accordance with the invention is illustrated in FIG. 7. The inventive process is preferably adaptive in the sense that it can be used to continually adjust downlink power levels for the active set members during the process of active communication. Accordingly, the process begins at step 700 with the establishment of a communication link between a base station and/or antenna in an active set, and a mobile station. The active set member monitors and measures characteristics, or qualities, of an uplink from the mobile station at step 702. Control systems, transceivers, or like elements in the base station, or a node connected thereto, calculate a downlink transmission power level as a function of the uplink signal quality measurements (step 704). The calculated power level is then applied to control the level of downlink transmission power used for the active link (step 706). In this way, systems operating in accordance with the invention can apply an optimal amount of downlink power for each of the active members serving a mobile station, without introducing unnecessary amounts of RF interference to the system. The level of downlink transmit power employed in response to the associated uplink quality can be calculated in a variety of ways to control downlink power.

Uplink quality can be measured by any variety of signal characteristics, as will be appreciated by those skilled in the art. One exemplary characteristic that can be used in accordance with an exemplary embodiment of the invention is a path gain, $g_i$, measured for a particular link i. Path gain (also referred to as negative path loss) is generally related to attenuation of a signal as related to an increase in a distance from a transmitter from which the signal originated. Assuming a total amount of transmit power, P, is available to the downlink antennas in an active set, the level of downlink transmission power $P_i$ used for the link i can be governed by equation 1:

$$P_i = P \frac{g_i}{\sum_{j=1}^{n} g_j}$$

where:

P is a total power available;

$g_i$ is a path gain measured for the uplink i; and n is a number of antennas/base stations in the active set.

Alternative uplink quality measurement factors can be used for the purposes of calculating an appropriate downlink power. For instance, a carrier-to-interference (C/I) ratio can be used to calculate a downlink power level in a fashion similar to that set out above with respect to Equation 1. More particularly, the level of downlink transmit power used for the link i can be governed by equation 2:

$$P_i = P \frac{C_i / I_i}{\sum_{j=1}^{n} C_j / I_j}$$

where:

P is a total power available;

$C_i/I_i$ is a carrier-to-interference ratio measured for the uplink i; and n is a number of base stations (or antennas) in the active set.

Using the C/I ratio to determine downlink power allocation may be more appropriate in situations where, for example, there is a higher probability of other active mobile units being in the vicinity. In such as situation, it is important to avoid disturbing surrounding communications by introducing more interference than is necessary to achieve one's own desired level of communications quality. By utilizing the uplink C/I ratio, an assessment can be made of the extent of any ambient interference present. Accordingly, the ratio can then be used to adjust the downlink transmission power levels so as to avoid unnecessarily increasing interference while maintaining a desirable level of communication quality.

Several advantages are achieved by using uplink characteristics for determining an appropriate power level for a corresponding downlink in accordance with the present invention. The practice of measuring downlink characteristics at a mobile station and reporting the results, as in, for example, DS-CDMA systems, provides a direct measure of downlink quality. However, as described in the Background section above, the overhead and resources consumed by such a system are substantial. In contrast, measuring uplink quality and utilizing the resulting measurements provides an effective means for assessing downlink characteristics. In accordance with exemplary embodiments of the invention, the uplink characteristics are measured at the active set base station(s). Consequently, there is no requirement for dedicating frame capacity to measurement reports in frames transmitted on the uplink. Furthermore, a base station does not have the same processing and power limitations as a mobile station and can more readily dedicate the processing resources necessary for assessing the uplink measurements. Any additional power consumption dedicated to processing uplink data and applying the results to control downlink power levels is insignificant in view of the power resources generally available at a base station.

As a further matter, many of the uplink quality factors may be readily available at a base station, as they are gathered pursuant to the requirements of an operating standard under which the system is operating. For example, in GSM and D-AMPS systems, measurements are taken for uplink signal strength, path gain and C/I ratios. Hence, while there as yet appears to be no use of such factors in determining a corresponding downlink power level using the foregoing information, the factors are nonetheless already available to the system for use in accordance with exemplary embodiments of the invention.

Processing of uplink quality information in a base station can be performed in a variety of ways as will be fully understood by those skilled in the art. As mentioned above, system variables for uplink quality that are maintained under existing standards can be used to perform downlink power control calculations. Referring back to FIG. 6A, the base station control unit 602, can operate in concert with the amplifiers (not shown) used to drive an antenna array and/or to control a level of downlink transmission power applied. Alternatively, componentry in the radio transceivers 606 can be utilized to measure uplink quality and thereafter apply such measurements to amplifier controls to adjust downlink transmission power levels, accordingly. Of course, transmission power control and uplink measurement can also be performed in one or more nodes to which the base station 600 is connected. Further discussion is omitted as those skilled in the art will readily be able to perform amplifier control and uplink signal measurement in accordance with the present invention.

Figure 4:
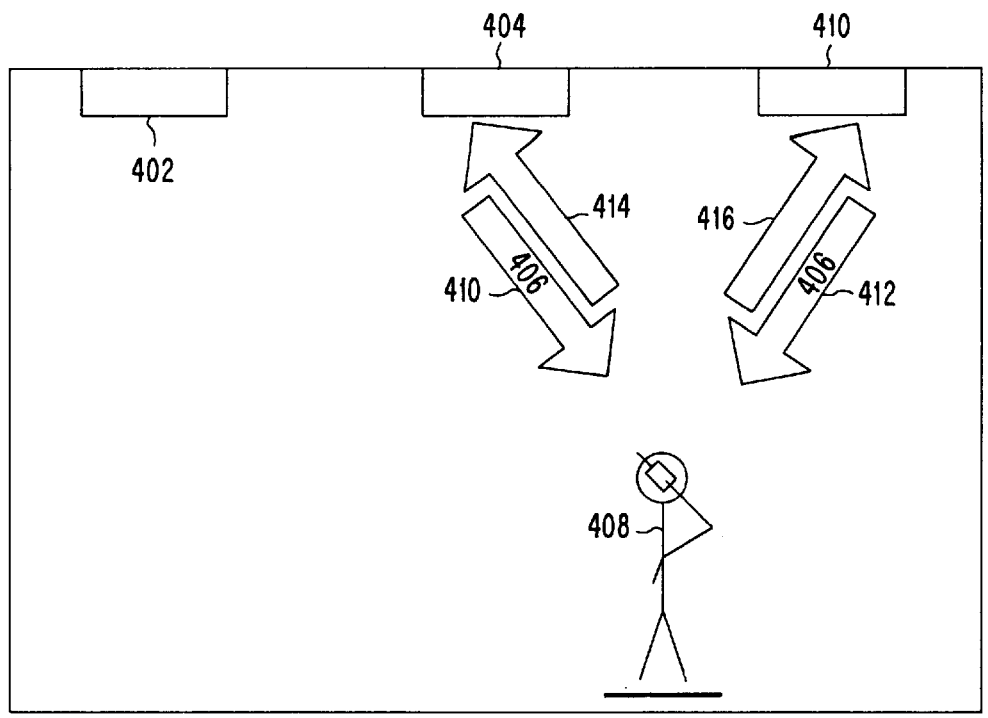
FIG. 4 depicts a macro diversity scenario in an indoor RF communication system wherein one or more of a plurality of individual antennas communicate with a mobile station.

Using an indoor RF radio system analogous to that depicted in FIG. 4 to perform a simulation, power allocation in accordance with the present invention between antennas in an active set revealed a demonstrable improvement in communication performance. The simulation involved several modeling considerations. For instance, the perceived power, C, for a given link, i, was modeled according to:

$$C = P_i g_i r_i^2 [W]$$

Wherein the downlink power used for the link i is denoted by $P_i$ and the average path gain, $g_i$, between a mobile and an antenna was modeled according to well known path loss prediction techniques. Fast fading was modeled as Rayleigh fading, denoted $r_i$, and was dependent on both time and frequency. Received interference power I was modeled as a sum of the instantaneous power from n interferers according to:

$$I = \sum_{i=1}^{n} P_i g_i r_i^2 [W]$$

The desired signal for a macro diversity scenario involving, for example, links 1 and 2 was calculated as:

$$C = P_1 g_1 r_2^2 + P_2 g_2 r_2^2 [W]$$

It is assumed that an equalizer in a mobile station can resolve multiple rays and add them coherently using maximal ratio combining, for instance. This can be achieved, for example, by delaying the transmission from one of the antennas by approximately one symbol time. Alternatively, a frequency offset can be selected for one of the links.

Figure 10:
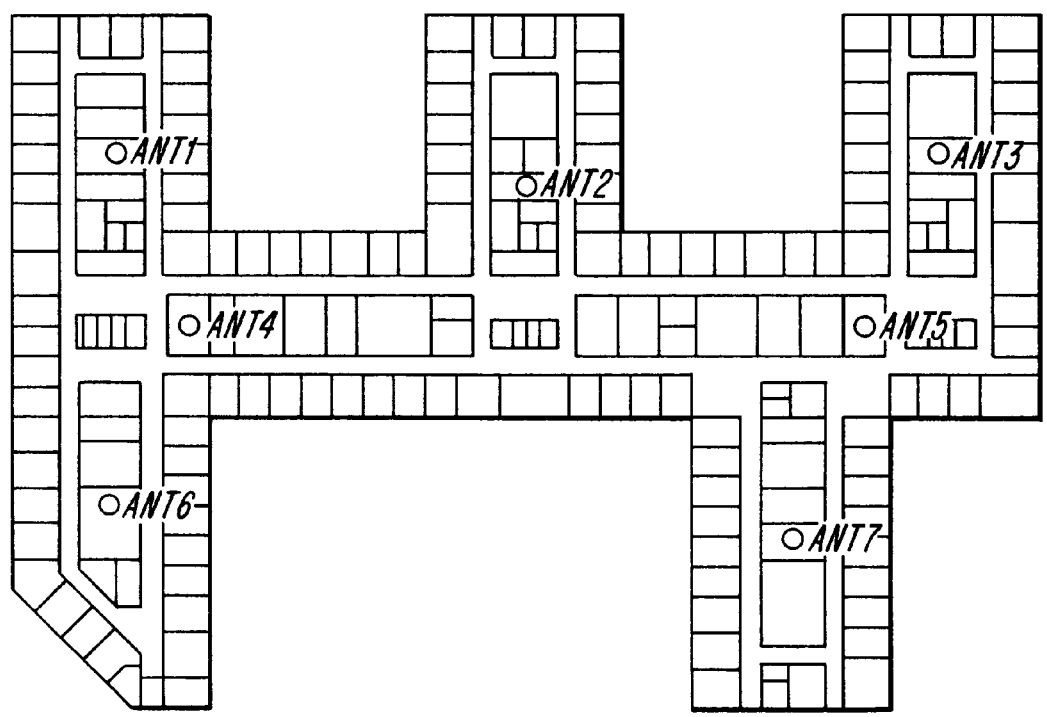
FIG. 10 is a map of a floor space used in accordance with a simulation performed using exemplary embodiments of the present invention.

The simulation involved five floors and a large number of mobile stations. The mobile stations were modeled to appear at equal probability levels over each of the floors. An individual floor used in the simulation is depicted in FIG. 10. Each of the floors was covered by seven antennas which were located in the same position on each floor. Each floor in the simulation was generally treated as an individual cell, which cell was covered exclusively by the seven antennas. Channel reuse was limited to one within each cell. Channels were randomly allocated to the mobiles on each floor. For each mobile, the two antennas with the highest average gain were chosen as macro diversity links. No more than two of the seven antennas were permitted to serve an individual mobile station. The total amount of power split between the two antennas was constant (i.e., $P = p_1 + p_2$). System performance was measured every 1/216 seconds in accordance with a GSM burst interval. Co-channel interference within the building was accounted for while adjacent channel interference was disregarded. Other parameters of the simulation are set out in Table 1 below:

TABLE 1

| Simulation parameters | |
|---|---|
| Parameter | Value |
| Percentage of the mobiles moving in the corridors | 6% |
| Downlink output power, p | 13 dBm |
| Antennas | omni (gain 0 dBi) |
| Floor attenuation | 22 dB |
| Wall attenuation | 2.1 dB |
| Number of cells | 5 (1 cell = 1 floor) |
| Traffic load (offered) | 70% channel utilization |

The simulation results were compared to a variety of conventional single-antenna operating arrangements. These included a singlecast arrangement wherein the average best link antenna in a cell was used for the downlink transmission to a mobile station. Also used for comparison purposes was an ideal singlecast arrangement wherein the system sends information from a single strongest link (one of seven in a cell) from burst to burst. Those skilled in the art will appreciate that the ideal singlecast method is generally infeasible in conventional systems because fast fading in the up- and downlinks is independent due to the frequency duplex distance.

Figure 8:
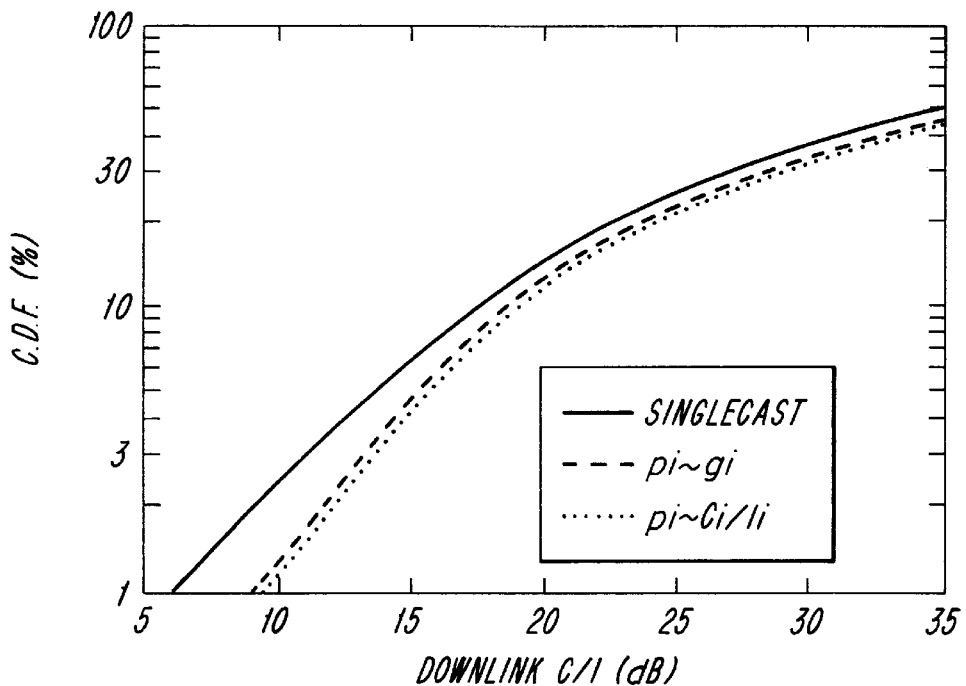
FIG. 8 is a graph illustrating the results of a first simulation used to demonstrate the performance of an exemplary downlink power control system in accordance with the present invention.
Figure 9:
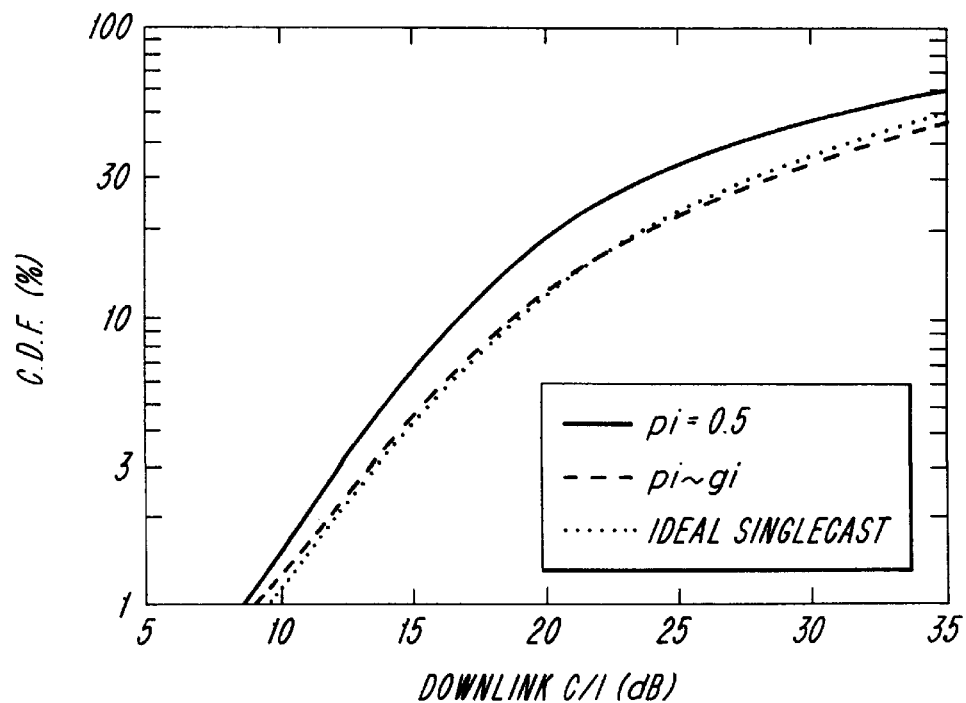
FIG. 9 is a graph illustrating the results of a second simulation used to demonstrate the performance of an exemplary downlink power control system in accordance with the present invention.

The comparison results of the simulation are depicted in FIGS. 8 and 9. For instance, FIG. 8 illustrates a comparison of the path gain ($g_i$) and C/I proportional downlink power allocation schemes with the conventional singlecast case. Gain in the ($g_i$) and C/I proportional downlink control schemes are similar at 1.0–1.5 dB at the 10% probability level for the cumulative distribution function (C.D.F.). However at lower dB levels, the gain is even larger.

FIG. 9 shows a comparison of ideal singlecast with the macro diversity scenario wherein downlink power for a link i is proportional to a path gain $g_i$ measured for the uplink portion of the link i (i.e., $p_i \sim g_i$). The improvement is noted in that operation in macro diversity with power allocation in accordance with the invention shows that performance levels rivaling those of an ideal singlecast scheme can be achieved. FIG. 9 also depicts the case where the power split between the two links is equal ($p_1=p_2$), to demonstrate that the interference level can be unnecessarily high when at least one of the downlinks is transmitting at too high a power level. In contrast, when using a power split scheme in accordance with the invention, the interference level is reduced.

In accordance with another aspect of the invention, uplink quality factors can be used in assessing whether or not a given link should be included or removed from an active set. Such an arrangement effectively assists in determining handoff. For example, the uplink measurements taken at each base station and/or antenna in the vicinity of a mobile station can be compared to a predetermined number, or level of quality, that indicates whether or not the base station and/or antenna should be added or deleted from the active set handling the mobile station. In the case where a mobile station moves out of one coverage area, whereby the uplink quality measurement for that coverage area (as measured by its corresponding base station) drops below a predetermined level, that link is dropped. Meanwhile, if the mobile station moves into a coverage area wherein an uplink measurement for a corresponding base station and/or antenna rises above a quality threshold, that base station/antenna may be added to the active set and thereafter actively communicate with the mobile station. Hence, handoff can be effectively achieved.

The invention disclosed herein relates to macro diversity radio communication systems. As disclosed and described herein, exemplary aspects of the invention are set out in the context of cellular telephone and indoor RF communication systems having macro diversity capabilities. However, it will be readily appreciated by those skilled in the art that the present invention can be applied to any RF communication system that can operate using macro diversity. Such systems also include, but are not limited to, optical (e.g. infra red) communications, and PCS systems. In addition, systems in accordance with the present invention can be applied in conventional systems, such as the power spilt system described in the Background section above. Accordingly, the scope of the invention is not intended to be limited by the exemplary embodiments set out herein, but rather by the claims appended hereto and equivalents thereof.

Although the invention has been described in detail with reference only to preferred embodiments, those skilled in the art will appreciate that various modifications can be made without departing from the invention. Accordingly, the invention is defined only by the following claims which are intended to embrace all equivalents thereof.

What is claimed is:

1. A method for controlling transmission power used in a downlink signal from a base station to a mobile station in a macro diversity radio system, the method comprising the steps of:

measuring a quality of an uplink signal received in the base station from the mobile station; and controlling more than one downlink signal so that a greatest amount of downlink signal transmission power is allocated to an active set link receiving a highest quality uplink signal.

2. The method of claim 1, wherein a greatest amount of downlink signal transmission power is allocated to an active set base station receiving a highest quality uplink signal.

3. The method of claim 1, wherein a greatest amount of downlink signal transmission power is allocated to an active set antenna link corresponding to a highest quality uplink signal.

4. The method of claim 1, wherein the step of measuring a quality of an uplink signal comprises:

measuring a path gain in the uplink signal.

5. The method of claim 1, wherein the step of measuring a quality of an uplink signal comprises:

measuring a carrier-to-interference ratio of the uplink signal.

6. The method of claim 1, wherein the step of measuring a quality of an uplink signal is selected from the group consisting of: measuring a bit error rate for the uplink signal, and measuring a frame erasure rate for the uplink signal.

7. The method of claim 1, wherein the step of measuring a quality of an uplink signal comprises:

measuring a quality of a carrier signal component of the uplink signal.

8. An apparatus for controlling transmission power used in a downlink between a base station and a mobile station in a macro diversity radio system, the apparatus comprising:

means for measuring a quality of an uplink signal received in the base station from the mobile station; and means for controlling more than one downlink signal so that a greatest amount of downlink signal is allocated to an active set link receiving a highest quality uplink signal.

9. The apparatus of claim 8, wherein a greatest amount of downlink signal transmission power is allocated to an active set base station receiving a highest quality uplink signal.

10. The apparatus of claim 8, wherein a greatest amount of downlink signal transmission power is allocated to an active set antenna link corresponding to a highest quality uplink signal.

11. The apparatus of claim 8, wherein the means for measuring a quality of an uplink signal comprises:

means for measuring a path gain in the uplink signal.

12. The apparatus of claim 8, wherein the means for measuring a quality of an uplink signal comprises:

means for measuring a carrier-to-interference ratio of the uplink signal.

13. The apparatus of claim 8, wherein the means for measuring a quality of an uplink signal is selected from the group consisting of: means for measuring a bit error rate for the uplink signal, and means for measuring a frame erasure rate for the uplink signal.

14. The apparatus of claim 8, wherein the means for measuring a quality of an uplink signal comprises:

means for measuring a quality of a carrier signal component of the uplink signal.

15. A method for selecting a base station for inclusion in an active set of base stations communicating with a mobile station in a macro diversity system, the method comprising the steps of:

measuring a quality of an uplink signal received in the base station from the mobile station;

comparing the quality of the uplink signal with a predetermined quality requirement; and including the base station in the active set if the quality of the uplink signal meets or exceeds the predetermined quality requirement;

wherein a number of base stations that can be added to the active set is dependent on a current traffic load.

16. A method for controlling transmission power used in a downlink signal from a base station to a mobile station in a macro diversity radio system, the method comprising the steps of:

measuring a quality of an uplink signal received in the base station from the mobile station; and controlling downlink signal transmission power in response to the measure of quality of the uplink signal;

wherein an amount of downlink signal transmission power is proportional to the measure of quality of a corresponding uplink signal and an amount of downlink signal transmission power, $P_i$, for a link i in an active set follows the proportion governed by:

$$P_i = P \frac{g_i}{\sum_{j=1}^{n} g_j}$$

where:

P is a total power available;

$g_i$ is a path gain for the uplink of link i; and n is a number of communication devices in the active set.

17. The method claimed in claim 16, wherein $g_i$ is an average path gain for the uplink of the link i.

18. The method claimed in claim 16, wherein the links are base station links and the communication devices are base stations.

19. The method claimed in claim 17, wherein the links are base station links and the communication devices are base stations.

20. The method claimed in claim 16, wherein the links are antenna links and the communication devices are antennas.

21. The method claimed in claim 17, wherein the links are antenna links and the communication devices are antennas.

22. A method for controlling transmission power used in a downlink signal from a base station to a mobile station in a macro diversity radio system, the method comprising the steps of:

measuring a quality of an uplink signal received in the base station from the mobile station; and controlling downlink signal transmission power in response to the measure of quality of the uplink signal;

wherein an amount of downlink signal transmission power is proportional to the measure of quality of a corresponding uplink signal and an amount of downlink signal transmission power, $P_i$, for a link i in an active set follows the proportion governed by:

$$P_i = P \frac{C_i / I_i}{\sum_{j=1}^{n} C_j / I_j}$$

where:

P is a total power available;

$C_i/I_i$ is a carrier-to-interference ratio for the uplink of the of link i; and n is a number of communication devices in the active set.

23. The method of claim 22, wherein $C_i/I_i$ is an average carrier-to-interference ratio measured for the uplink of the link i.

24. The method claimed in claim 22, wherein the links are base station links and the communication devices are base stations.

25. The method claimed in claim 23, wherein the links are base station links and the communication devices are base stations.

26. The method claimed in claim 22, wherein the links are antenna links and the communication devices are antennas.

27. The method claimed in claim 23, wherein the links are antenna links and the communication devices are antennas.

28. An apparatus for controlling transmission power used in a downlink between a base station and a mobile station in a macro diversity radio system, the apparatus comprising:

means for measuring a quality of an uplink signal received in the base station from the mobile station; and means for controlling the amount of transmission power used for the downlink signal power, the amount of transmission power being based on the quality of the uplink signal measured;

wherein an amount of downlink signal transmission power is proportional to the measure of quality of a corresponding uplink signal and an amount of downlink signal transmission power, $P_i$, for a link i in an active set follows the proportion governed by:

$$P_i = P \frac{C_i / I_i}{\sum_{j=1}^{n} C_j / I_j}$$

where:

P is a total power available;

$g_i$ is a path gain for the uplink of link i; and n is a number of communication devices in the active set.

29. The apparatus of claim 28, wherein $g_i$ is an average path gain for the uplink of the link i.

30. The apparatus of claim 28, wherein the links are base station links and the communication devices are base stations.

31. The apparatus of claim 29, wherein the links are base station links and the communication devices are base stations.

32. The apparatus of claim 28, wherein the links are antenna links and the communication devices are antennas.

33. The apparatus of claim 29, wherein the links are antenna links and the communication devices are antennas.

34. An apparatus for controlling transmission power used in a downlink between a base station and a mobile station in a macro diversity radio system, the apparatus comprising:

means for measuring a quality of an uplink signal received in the base station from the mobile station; and means for controlling the amount of transmission power used for the downlink signal power, the amount of transmission power being based on the quality of the uplink signal measured;

wherein an amount of downlink signal transmission power is proportional to the measure of quality of a corresponding uplink signal and an amount of downlink signal transmission power, $P_i$, for a link i in an active set follows the proportion governed by:

$$P_i = P \frac{C_i/I_i}{\sum_{j=1}^{n} C_j/I_j}$$

where:

P is a total power available;

$C_i/I_i$ is a carrier-to-interference ratio for the uplink of the link i; and n is a number of communication devices in the active set.

35. The apparatus of claim 34, wherein $C_i/I_i$ is an average carrier-to-interference ratio measured for the uplink of the link i.

36. The apparatus of claim 34, wherein the links are base station links and the communication devices are base stations.

37. The apparatus of claim 35, wherein the links are base station links and the communication devices are base stations.

38. The apparatus of claim 30, wherein the links are antenna links and the communication devices are antennas.

39. The apparatus of claim 35, wherein the links are antenna links and the communication devices are antennas.

* * * * *

UNITED STATES PATENT AND TRADEMARK OFFICE
CERTIFICATE OF CORRECTION

PATENT NO. : 6,104,933 Page 1 of 1
DATED : August 15, 2000
INVENTOR(S) : Magnus Frodigh, Fredric Kronestad, Mikael Gudmunson and Magnus Almgren It is certified that error appears in the above-identified patent and that said Letters Patent is hereby corrected as shown below:

<u>Title page,</u>
Item [75], correct the spelling of the second inventor's name from "Fredric Kronestad" to -- Fredric Kronestedt --, and correct the spelling of the third inventor's name from "Mikael Gudmunson" to -- Mikael Gudmundson --.

<u>Column 2,</u>
Line 50, before the phrase "the C/I ratio", add -- decreases --.

<u>Column 6,</u>
Line 25, delete the formula, and insert the following formula: $P_i = P \dfrac{g_i}{\sum_{j=1}^{n} g_j}$ <u>Column 7,</u>
Line 59, delete the formula, and insert the following formula: -- $C = P_i g_i r_i^2 [W]$ --

<u>Column 8,</u>
Line 9, delete the formula, and insert the following formula: -- $C = P_1 g_1 r_1^2 + P_2 g_2 r_2^2 [W]$ --

<u>Column 9,</u>
Line 49, delete "spilt", and insert -- split --.

<u>Column 11,</u>
Line 20, delete the formula, and insert the following formula: $P_i = P \dfrac{g_i}{\sum_{j=1}^{n} g_j}$ <u>Column 12,</u>
Line 30, delete the formula, and insert the following formula: $P_i = P \dfrac{g_i}{\sum_{j=1}^{n} g_j}$ Signed and Sealed this Second Day of July, 2002

*Attest:*

*Attesting Officer*

JAMES E. ROGAN
*Director of the United States Patent and Trademark Office*